United States Patent

(12) United States Patent
Regli et al.

(10) Patent No.: US 9,131,167 B2
(45) Date of Patent: Sep. 8, 2015

(54) BROKER SERVICE SYSTEM TO ACQUIRE LOCATION BASED IMAGE DATA

(75) Inventors: Markus A. Regli, Rueschlikon (CH); Ruediger Rissmann, Rueschlikon (CH); Marc P. Stoecklin, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 821 days.

(21) Appl. No.: 13/330,487

(22) Filed: Dec. 19, 2011

(65) Prior Publication Data

US 2013/0155246 A1 Jun. 20, 2013

(51) Int. Cl.
*H04N 7/18* (2006.01)
*H04N 1/32* (2006.01)
*G06F 17/30* (2006.01)

(52) U.S. Cl.
CPC ...... *H04N 1/32101* (2013.01); *G06F 17/30265* (2013.01); *H04N 2201/3253* (2013.01); *H04N 2201/3274* (2013.01); *H04N 2201/3278* (2013.01)

(58) Field of Classification Search
CPC .................. G06F 17/30265; H04N 1/32101; H04N 2201/3253; H04N 2201/3274; H04N 2201/3278; H04N 21/21805; H04N 21/2187; H04N 21/25841; H04N 21/2743; H04N 21/41407; H04N 21/4223; H04N 21/4788; H04N 21/8549; H04N 5/765; H04N 21/214; H04N 21/632; H04N 21/812
USPC ........ 725/32, 53, 78, 133, 141, 153; 348/159, 348/E7.085; 386/223
See application file for complete search history.

(56) References Cited

U.S. PATENT DOCUMENTS 7,986,339 B2 7/2011 Higgins
2007/0043603 A1* 2/2007 Andersen et al. ................. 705/9

(Continued)

FOREIGN PATENT DOCUMENTS

JP 2001339334 12/2001
JP 2004326406 11/2004

(Continued)

OTHER PUBLICATIONS

Ardagna, Claudio A. et al., "An Obfuscation-based Approach for Protecting Location Privacy", IEEE Transactions on Dependable and Secure Computing (2009) 16 pages.

(Continued)

*Primary Examiner* — Sath V Perungavoor
*Assistant Examiner* — Dakshesh Parikh
(74) *Attorney, Agent, or Firm* — DeLizio Law, PLLC

(57) ABSTRACT

A broker service that acquires location based image data receives a request from a requestor. The request comprises request criteria that at least include a location criterion and a time criterion for obtaining image data, which comprises at least one of a still image and a video. The broker service determines that a position indication of a first producer of a plurality of producers fulfils the location criterion at least to an extent. The plurality of producers comprises devices remote from the requestor and having capabilities of image capture and location determination. The broker service transmits an image request to the first producer. The image request corresponds to the request. The broker service receives image data from the first producer responsive to the image request. The broker service determines that the image data fulfils the time criterion. The broker service transmits the image data to the requestor.

19 Claims, 11 Drawing Sheets

(56) References Cited

U.S. PATENT DOCUMENTS

| 2007/0136086 | A1* | 6/2007 | Luerssen | 705/1 |
|---|---|---|---|---|
| 2008/0126109 | A1* | 5/2008 | Cragun et al. | 705/1 |

FOREIGN PATENT DOCUMENTS

| JP | 2007179553 | 7/2007 |
|---|---|---|
| JP | 2007207260 | 8/2007 |
| JP | 2009296452 | 12/2009 |

OTHER PUBLICATIONS

Ardagna, C A. et al., "Location Privacy Protection Through Obfuscation-based Techniques", Proc. of the 21st Conference on Data and Applications Security. vol. 4602 of Lecture Notes in Computer Science., Springer (2007) 47-60, 16 pages.

Bellavista, Paolo et al., "Efficiently Managing Location Information with Privacy Requirements in Wi-Fi Networks: a Middleware Approach", In Proc. of the International Symposium on Wireless Communication Systems (ISWCS'05), pp. 1-8, Siena, Italy (2005), 5 pages.

Duckham, Matt et al., "A formal model of obfuscation and negotiation for location privacy", In Proc. of the 3rd International Conference PERVASIVE 2005, Munich, Germany, 19 pages.

Gruteser, Marco et al., "Anonymous Usage of Location-Based Services Through Spatial and Temporal Cloaking", In Proc. of the 1st International Conference on Mobile Systems, Applications and Services (MobiSys), The USENIX Association (2003), 12 pages.

\* cited by examiner

BROKER SERVICE SYSTEM TO ACQUIRE LOCATION BASED IMAGE DATA

BACKGROUND

Embodiments of the inventive subject matter generally relate to the field of computing, and, more particularly, to a broker service system to acquire location based image data.

Providing or acquiring accurate and timely location-specific image data to a requestor as to the conditions at a given location is a complex task. There exist many scenarios, in which access to image material may be important to improve the situational awareness, such as to obtain an overview, to quickly spot potential issues, or to understand causes for problems.

For example, understanding the traffic situation on a highway, e.g., after a road accident or under difficult weather circumstances, requires authorities to send out patrol cars or helicopters, possibly equipped with cameras, to picture and transmit the current state to the headquarters or other road users.

Another example may be to efficiently respond to emergency situations, e.g., road or chemical accidents, fire outbreaks or environmental incidents. Emergency services critically depend on early and accurate information as to the current conditions in the area, in order to prepare rescue operations, recognize access points, and evaluate risks.

Further, in another example, a private person planning to attend an event wants to know about the state of free parking spots and the rush on the area of interest.

For providing location-specific image data, it is conventionally employed to install cameras at fixed points, e.g., surveillance cameras, web cams, cars and helicopters patrolling and reporting to headquarters, and military satellite systems.

However, these solutions are generally time-consuming and costly to operate and are not flexible in terms of coverage. Fixed cameras can only provide surveillance information of a very limited area, where they have been installed, while possibly being able to provide a 360-degree view; they may not be applicable to remote areas.

To cover such areas, a vehicle might be sent out or satellites imagery must be requested. This renders the image gathering process expensive in terms of time and money.

Moreover, the conventional solutions are furthermore reserved to authorities. On the other side, a private person interested in a certain current parking spot situation or the crowdedness at a certain location, e.g. at some beach, may not be able to obtain such information.

Another solution for providing location-specific image data is to take stock photos from an image data base of the certain location of interest. Such an offline solution has the disadvantage that no live or actual data can be provided. Further, mandates may be given to photographers for taking location-specific image data from the certain location. However, also this solution has the disadvantage that no live actual data can be provided and further the solution may be very costly.

Moreover, for acquiring location-specific image data, oral requests to pilots or drivers may be given to have a report about situations in the certain location or locations of interest.

Protecting the location privacy of users has been studied in the context of location-based services, e.g., where users request more information, such as restaurants, weather conditions, tourist information, depending on their current location.

SUMMARY

Embodiments of the inventive subject matter include a method for providing a broker service that acquires location based image data. The method receives a request from a requestor. The request comprises request criteria that at least include a location criterion and a time criterion for obtaining image data, which comprises at least one of a still image and a video. It is determined that a position indication of a first producer of a plurality of producers fulfils the location criterion at least to an extent. The plurality of producers comprise devices remote from the requestor and have capabilities of image capture and location determination. An image request is transmitted to the first producer. The image request corresponds to the request. Image data from the first producer is received responsive to the image request. It is determined that the image data fulfils the time criterion. The image data is transmitted to the requestor.

Embodiments of the inventive subject matter include a computer program product for a broker service to acquire location based image data. The computer program product comprises a computer readable storage medium having computer usable program code embodied therewith. The computer usable program code comprises a computer usable program code configured to collect position indications of a plurality of producers that are subscribed to the broker server. The position indication of each of the plurality of producers indicates an area that encompasses a position of the producer. The computer usable program code is configured to acquire image data capture capabilities of the plurality of producers that at least indicate whether still images or video or both can be captured. The computer usable program code is configured to store requestor profiles, wherein each of the requestor profiles at least indicates a location to capture image data for a request. The computer usable program code is configured to determine which of the plurality of producers match the requestor profile for each of the requestor profiles. Each of the requestor profiles at least indicates a location and a requestor. transmit, to the at least one of the plurality of producers that match, an image request indicating at least the location for each of the requestor profiles that have at least one of the plurality of producers that match. The computer usable program code is configured to, responsive to receiving image data from a producer responding to an image request, transmit the image data to the requestor that corresponds to the requestor profile to which the image request corresponds.

BRIEF DESCRIPTION OF THE DRAWINGS

The present embodiments may be better understood, and numerous objects, features, and advantages made apparent to those skilled in the art by referencing the accompanying drawings.

Similar or functionally similar elements in the figures have been allocated the same reference signs if not otherwise indicated.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

Figure 1:
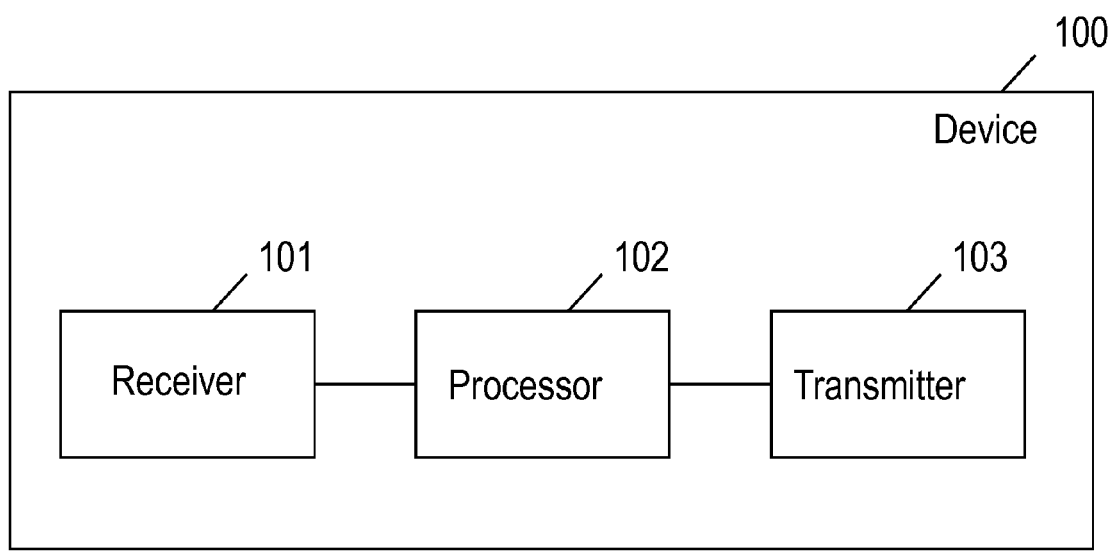
FIG. 1 shows a schematic block diagram of a first embodiment of a device for providing actual location-specific image data to a requestor.

In FIG. 1, a schematic block diagram of a first embodiment of a device 100 for providing actual location-specific image data to a requestor is depicted. The device 100 may be a server or a broker. The device 100 is coupled to a number of producers (see FIGS. 3 and 4) of location-specific image data. The respective producer is adapted to provide actual location-specific image data of a certain location or certain locations. The certain location may be defined by the requestor. Each producer has a producer profile including at least a position indication indicating the position of the producer.

The device 100 has a receiver 101, a processor 102, and a transmitter 103.

The receiver 101 is configured to receive a request for location-specific image data of the certain location from the requestor. The processor 102 is adapted to match at least one producer with the requestor in dependence on the received request, the producer profiles and an actuality indication. The actuality indication indicates a predefined actuality of the requested location-specific image data of the certain location.

The transmitter 103 is configured to transmit the requested location-specific image data from the at least one matched producer to the requestor. For transmitting the location-specific image data, a communication link, in particular a mobile communication link may be used.

For example, the receiver 101 may be configured to receive updated producer profiles from the coupled producers of location-specific image data, and the processor 102 may then be configured to match the at least one producer with the requestor in dependence on the received request, the received updated producer profiles and the actuality indication.

According to another example, the receiver 101 may be configured to receive the request including the actuality indication, wherein the processor 102 may be then configured to extract the actuality indication from the received request and to match the at least one producer with the requestor in dependence on the received request, the producer profiles and the extracted actuality indication.

The device 100 can provide actual location specific image data or in other words current location specific image data or in other words time actual location specific image data to the requestor.

Figure 2:
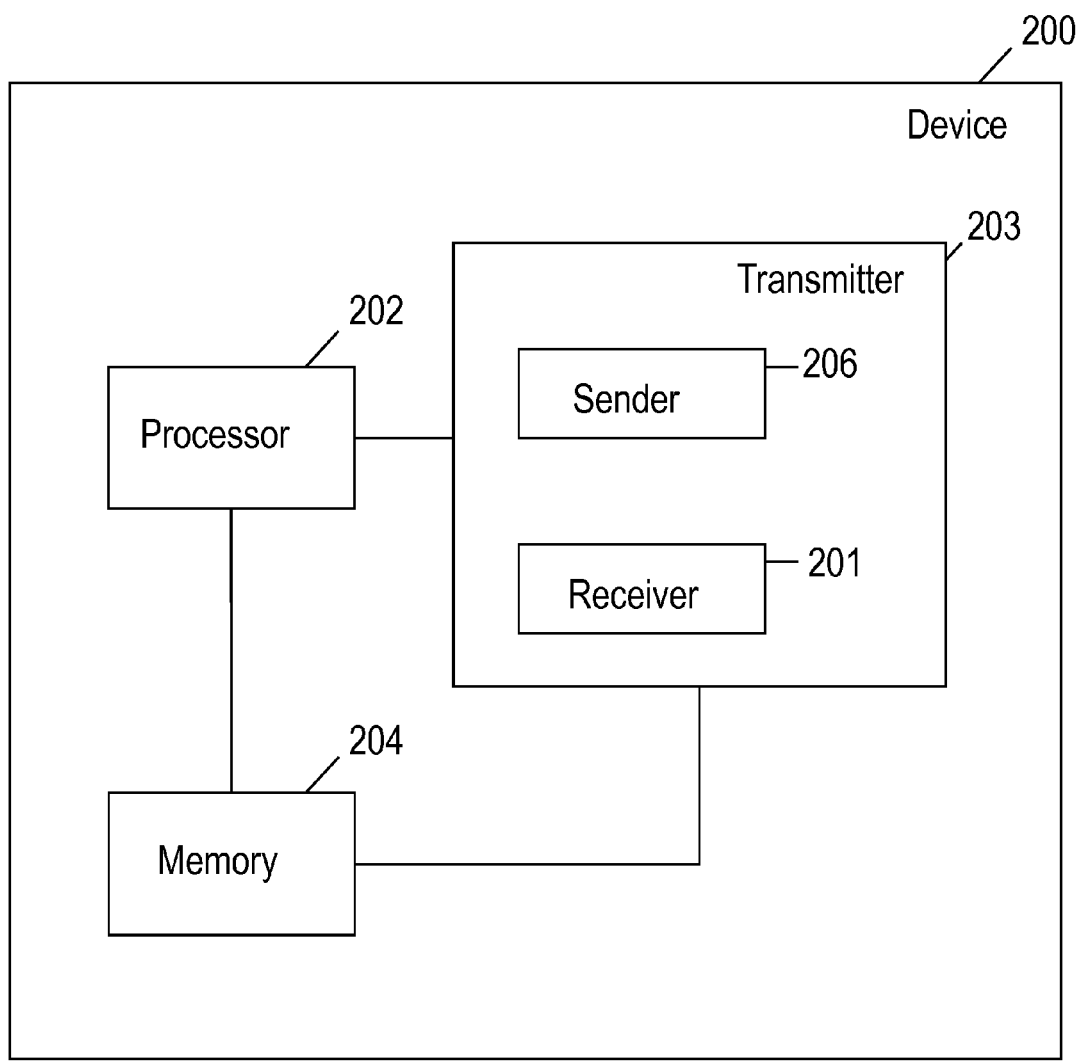
FIG. 2 shows a schematic block diagram of a second embodiment of a device for providing actual location-specific image data to a requestor.

FIG. 2 illustrates a schematic block diagram of a second embodiment of the device 200 for providing actual location-specific image data to a requestor.

The device 200 has a receiver 201, a processor 202, and a transmitter 203 which may exemplarily be embodied as the receiver 101, the processor 102 and the transmitter 103 of FIG. 1. Further, the device 200 has a memory 204.

The receiver 201 may be a part of the transmitter 203 also including a sender 206.

The memory 204 may be coupled to the processor 202 and to the transmitter 203 for exchanging data, like producer profiles and/or requestor profiles.

In particular, the memory 204 of FIG. 2 may be adapted to store a requestor profile for each requestor subscribed with the device 200. The respective requestor profile may include at least an actuality indication indicating a predefined actuality of location-specific image data requested by the respective requestor. The predefined actuality specifies the required or desired actuality of the image data.

For the case of using such a memory 204, the processor 202 may be configured to match the at least one producer with the requestor in dependence on the received request from the requestor, the stored producer profiles and the stored requestor profiles.

The sender 206 of the transmitter 202 may be configured to send participation requests to the producers that match with the requestor. In response to the sent participation requests, the receiver 201 may receive participation responses from the matched producers.

Further, in response to the received participation responses, the processor 202 may generate a producer proposal. The producer proposal may indicate a number of producers matched with the requestor. The generated producer proposal may be sent to the requestor by said sender 206.

In response to the sent producer proposal, the receiver 206 may receive a producer selection from the requestor. Further, the sender 206 may send an image request for triggering the transfer of the requested location-specific image data to the producer selected by means of the received producer selection.

In response to the sent image request, the receiver 201 may receive an image response including the requested location-specific image data from the selected producer. In the following, the sender 206 may send the received image response to the requestor.

Figure 3:
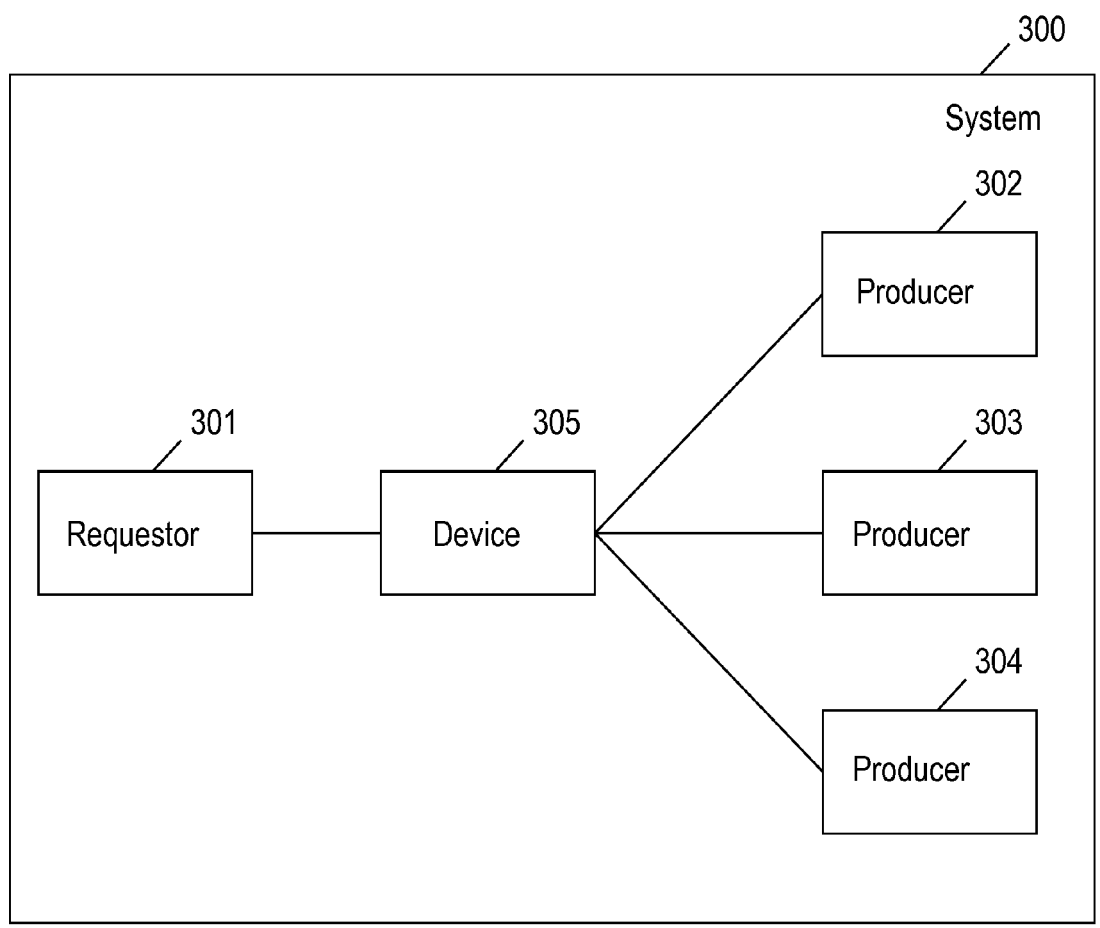
FIG. 3 shows a schematic block diagram of a first embodiment of a system for providing actual location-specific image data to a requestor.

In FIG. 3, a schematic block diagram of a first embodiment of a system 300 for providing actual location-specific image data to a requestor 301 is shown. The system 300 has a number of producers 302, 303 and 304 of location-specific image data. Without loss of generality, the embodiment of FIG. 3 shows three producers 302, 303 and 304. Each producer 302, 303 and 304 is adapted to provide actual location-specific image data for a certain location or certain locations which may be selected by the requestor 301. Further, each producer has a certain producer profile including at least a position indication indicating the position of the producer 302, 303 and 304. Said producers 302, 303 and 304 are subscribed with and coupled to the device 305. Said device 305 is coupled between the requestor 301 and the producers 302, 303 and 304. Said couplings may be provided by communication links. The device 305 may be adapted to manage the transfer of location-specific image data selected by at least one request from the requestor.

The device 305 of FIG. 3 may be embodied as the device 100 of FIG. 1 or the device 200 of FIG. 2. Further, each of the producers 302, 303 and 304 may send an updated producer profile including a blurred position as the position indication to the device 305. The blurred position is configured to blur an exact or true position of the respective producer 302, 303 and 304. Said updated producer profile may be generated in dependence on a defined change of the position of the producer or alternatively in dependence on a time-out of a timer for sending updated producer profiles. Said defined change of the position of the producer may be determined by a certain blurring radius, in particular selected by the respective requestor. For example, the respective producer 302, 303 and 304 may calculate the blurred position in dependence on the actual exact position of the respective producer 302, 303 and 304, a distance random number taken from [0, R] and angle random number taken from [0, 360°].

Figure 4:
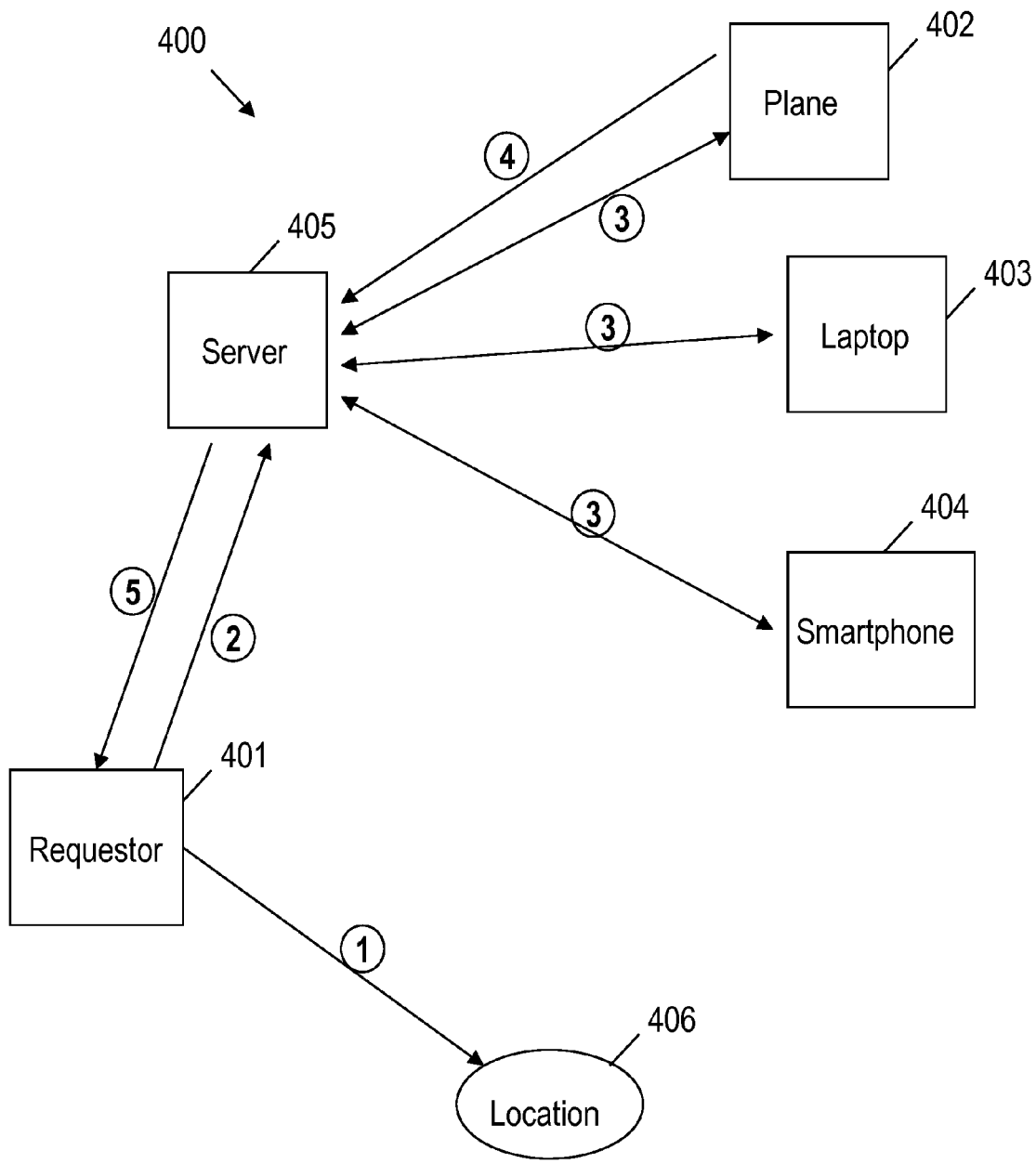
FIG. 4 shows a schematic block diagram of a second embodiment of a system for providing actual location-specific image data to a requestor.

FIG. 4 shows a schematic block diagram of a second embodiment of a system 400 for providing actual location-specific image data to a requestor 401. The system 400 of FIG. 4 has a plane 402, a laptop 403, a smart phone 404 as the producers of location-specific image data, a server 405 as the device coupling said producers 402 to 404 with the requestor 401. Further, reference sign 406 in FIG. 4 shows the location of interest, identified by the requestor 401.

Moreover, the system 400 may have a GPS system (not shown) for locating producers near the location of interest 406.

Steps 1 to 5 in FIG. 4 illustrate the functionality of the embodiment of FIG. 4.

In step 1, the requestor 401 recognizes that it needs an image of the location 406.

In step 2, the requestor 401 sends a request to the server 405, for example an image broker.

In step 3, the server 405 looks up producers, here the plane 402, the laptop 403 and the smart phone 404, close to the location 406 and sends picture requests to the plane 402, the laptop 403 and the smart phone 404.

In step 4, the plane 402 as the accepting producer sends an image to the server 405.

In step 5, the server 405 forwards the image to the requestor 401.

Figure 5:
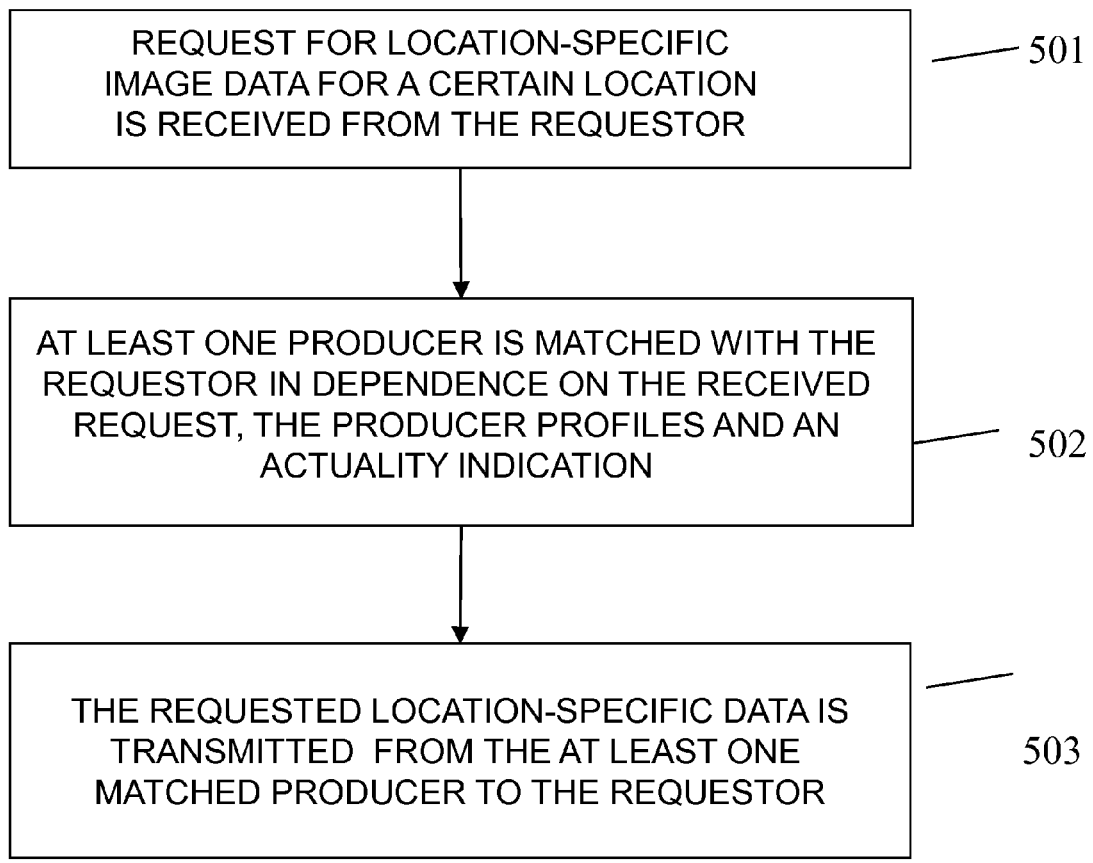
FIG. 5 shows a first embodiment of a sequence of method steps for providing actual location-specific image data to a requestor.

In FIG. 5, a first embodiment of a sequence of method steps for providing actual location-specific image data to a requestor from at least one of a number of producers of location-specific image data is depicted. Each producer is adapted to provide actual location-specific image data of a certain location or certain locations. Further, each producer has a producer profile including at least a position indication indicating the position of the producer.

In step 501, a request for location-specific image data for a certain location is received from the requestor.

In step 502, at least one producer is matched with the requestor in dependence on the received request, the producer profiles and an actuality indication. The actuality indication indicates a predefined actuality of the requested location-specific image data of the certain location. The predefined actuality may be defined by the requestor.

In step 503, the requested location-specific data is transmitted from the at least one matched producer to the requestor.

The steps 501, 502 and 503 may be embodied by a computer program when run on at least one computer.

Figure 6:
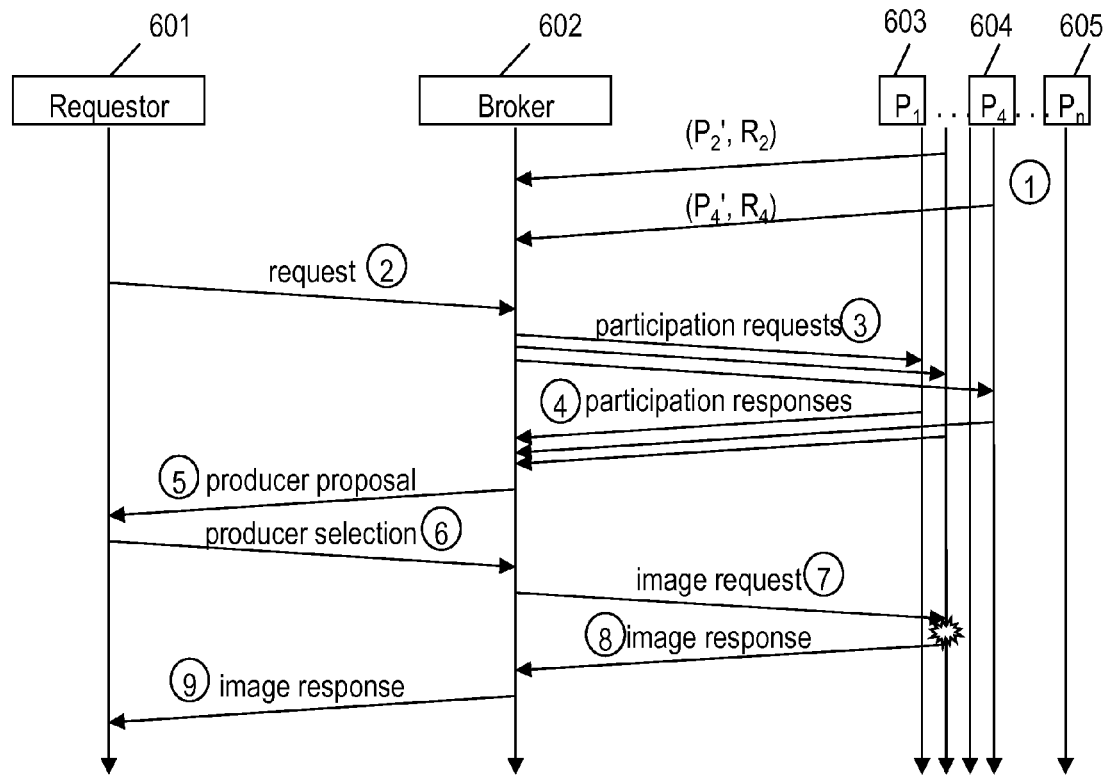
FIG. 6 shows a second embodiment of a sequence of method steps for providing actual location-specific image data to a requestor.

FIG. 6 shows a second embodiment of a sequence of method steps for providing actual location-specific image data to a requestor 601.

The requestor 601 is coupled to a broker 602. Further, producers 603-605 of location-specific image data are registered with and coupled to the broker 602. Without loss of generality, FIG. 6 shows three producers 603-605.

With respect to the embodiment of FIG. 6, a two-phase image transfer protocol is depicted in which suitable producers 603-605 are determined while maintaining the requestor 601 in the decision loop.

The present method of FIG. 6 has the following steps 1 to 9. After reporting the position of the producers 603-605 to the broker 602 (step 1), and within the first phase embodied by steps 2-5, the broker 602 identifies and proposes candidate producers 603-605 willing to participate to the image requestor 601. In the second phase embodied by steps 6-9, the requestor 601 controls from which producer or producers 603-605 and optionally under which conditions image data should be requested.

It is assumed that multiple producers, here the producers 603-605, are subscribed to the broker 602. Examples of image producers 603-605 may include private persons equipped with hand-held devices, professional photographers, persons owning webcams, or authorities controlling fixed installed cameras. In this regard, FIG. 6 shows the messages exchanged while handling an image request of the requestor 601. In detail:

In step 1, the producers 603-605 report their actual or blurred geographic location areas regularly to the broker 602. Further, within step 1, together with the location updates, a set of further information elements may be reported to the broker 602, such as the respective capabilities of the respective producer 603-605. Such further information elements may include information about available camera equipment or the interest of receiving a certain request, e.g. only requests with certain remuneration. The broker 602 may record the updates provided by the producers 603-605 together with their general producer profile. The producer profile of a producer 603-605 may contain statistics from early assignments, like ratings of image quality, timeliness, correctness, proficiency level, reliability in responding to requests and the like.

In step 2, the requestor 601 sends a request for location-specific image data of a certain location to the broker 602. Said request may include relevant key values for the image material of interest, such as an actuality indication indicating the required or desired actuality of the images, the location, object or event to be documented, type of image, urgency of the request and potential remuneration of the image material. The certain location may be expressed as a geographical area, GPS coordinates, address, point of interest or event location, like a sport event, a concert or a demonstration. The object or event may consist of a landmark, a street, a building or an area, as well as particular events, e.g. the entrance of a train. The image material may be taken as still photography or video with aerial or street-view perspective. Depending on the request, the urgency may be important, e.g. for a first report on an accident or on an environmental disaster, to prepare an appropriate reaction and equipment. For other requests, like queuing, traffic or road conditions, the urgency may not be critical, but a timely response may still be desired. Depending on the kind of request, the requestor 601 may offer remuneration to the respective producer 603-605 as an incentive, e.g. monetary or credit-based compensation. Examples of an image requestor 601 may include emergency services, security and environmental agencies, new companies or private persons.

In step 3, the broker 602 sends a participation request to the respective producer 603-605 specifying the relevant producers 603-605 of the request and providing them with all necessary details. In detail: The broker 602 has accepted the image request and identifies the best-matching producer or producers 603-605 to the service depending on the current producer profile. As indicated above, the producer profile may include the geographical location of the producer, the capabilities of taking the type of image requested, and the incentives expected. Embodiments for reporting a blurred location or geographical position to the broker 602 are described with reference to FIGS. 8-11.

Figure 7:
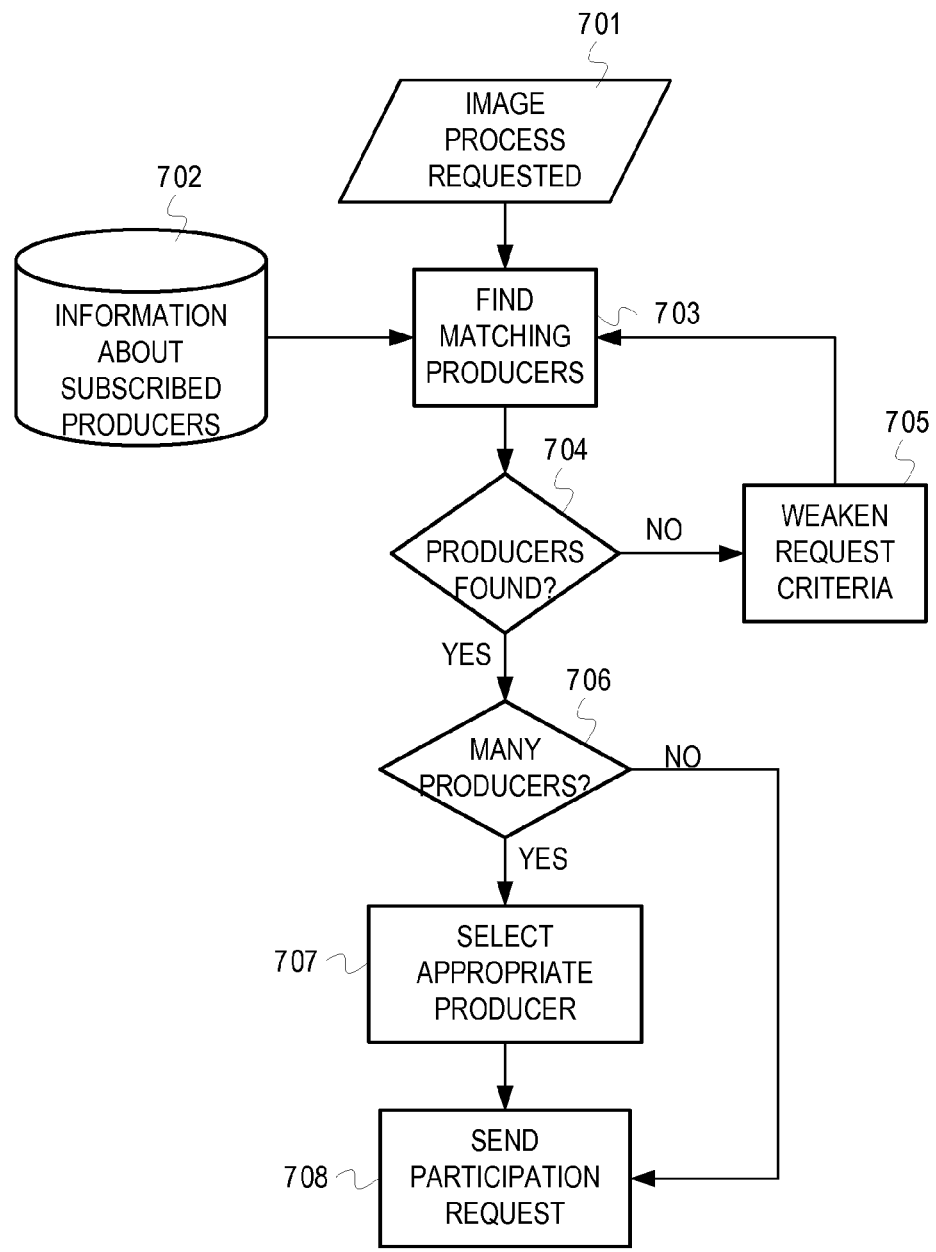
FIG. 7 shows an embodiment of a sequence of method steps for selecting an appropriate producer of a plurality of possible producers.

Further, in FIG. 7, an embodiment of a method for the broker 602 to select appropriate producers is shown.

In step 701, an image request is received. In step 702, information about producers subscribed with the broker 602 are provided. Said information may include location, equipment, availability and the like.

In step 703, suitable producers are matched with respect to the received request.

In step 704, it is checked if one or more producers are found.

If no producer fulfilling the criteria has been found in step 704, e.g. because no producer is in the area of interest, the method proceeds with step 705. In step 705, the broker 602 might automatically weaken the criteria or attributes of the request for repeating step 703, e.g. the limits of the geographic location are widened, and the expected quality is reduced or time bounds are adapted.

Otherwise, if step 704 is answered yes, the method proceeds with step 706. In step 706, it is checked if a plurality of producers is found. If too many producers fulfilling the criteria have been found, e.g. many producers attend a soccer match or are at the beach exemplarily, the broker 602 may select producers with high user ratings from previous assignments. This is checked in step 707 for selecting an appropriate producer. If no such additional check is assumed to be necessary, the method directly proceeds with step 708.

In step 708, participation requests are sent to the selected producer or producers.

Coming back to FIG. 6, in step 4, the selected producers 603-605 send participation responses to the broker 602 after receiving said participation requests in step 3. Said participation response may include information for accepting the respective job. Together with the acceptance, the participation response may include certain conditions, such as expected remuneration or time needed to produce the image material. If none of the requested producers 603-605 is willing to participate or none responded within a certain time frame, the broker 602 may again weaken the request criteria and repeat step 3.

In step 5, the broker 602 sends a producer proposal to the requestor 601. Said producer proposal may include information regarding the producers 603-605 interested in participating. This is done in an anonymous fashion without revealing the identity of the respective producer 603-605. For example, the current blurred locations of the producer 603-605 may be shown on a map, together with the respective conditions imposed. The requestor 601 may sift through the producers and decide for one or more of them, or none. Furthermore, at this stage, the requestor may as well abandon the request and/or refine the criteria and start over at step 2.

In step 6, the requestor 601 sends a producer selection identifying the selected producer or producers to the broker 602. Thus, the requestor 601 accepts the conditions of the selected producer 603-605.

In step 7, the broker 602 sends an image request to the selected producers 603, for example.

In step 8, the selected producer 603 follows the instructions specified by the image request and produces the image material. The image material is sent to the broker 602 by an image response in step 9. Said image response is forwarded by the broker 602 to the requestor 601.

After the transaction, the broker 602 may handle the remuneration of the selected producer 603 and ratings from the requestor 601 of the assignment. Because of the use of the broker 602 as man in the middle, the present method preserves the anonymity of the communication end points involved.

Figure 8:
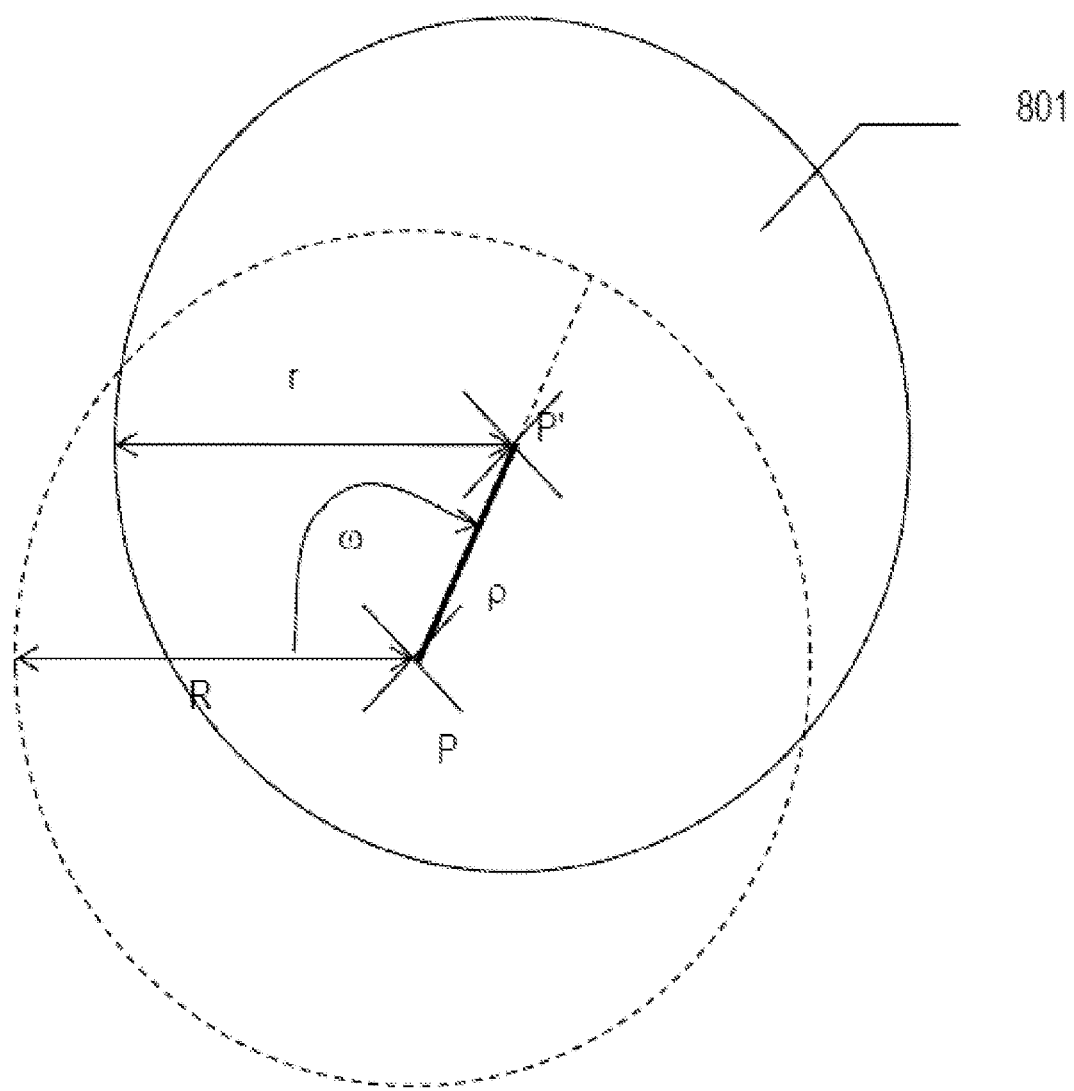
FIG. 8 shows a diagram illustrating an embodiment of a true position of a producer and a blurred location area announced to the device.

In FIG. 8, a diagram illustrating an embodiment for a location update of the blurred location area provided by the producer and announced to the device is depicted.

An image producer willing to participate may send regular updates of his position to the broker. Since privacy of the producer may be a concern, he does not want to reveal his exact position. Therefore, a user-customizable obfuscation of the current position of the producer may be provided. The producer may choose the level of accuracy of the location which is reported to the broker. With respect to FIG. 8, a blurring radius R determines the maximal distance between the true position P of the producer and the blurred position P' reported to the broker. A method, in the following also referred to as method A, for determining the blurred position P' from the true position P for a given blurring radius R has the following four steps:

In a first step, the true position P is determined, e.g., by GPS.

In a second step, a random number $\rho$ is drawn from $[0, R]$ uniformly, $\rho$ describing the distance of the blurred position P' from the true position P.

In a third step, a random number $\omega$ is drawn from $[0, 360]$ uniformly, $\omega$ describing the angle around the true position P.

In a fourth step, the blurred position P' is determined by adding $(\rho, \omega)$ in polar coordinates to P.

As a result, FIG. 8 depicts an instance of a reported blurred position P' based on P after applying above method A. The grey shaded disk 801 in FIG. 8 denotes the blurred location area with the radius r (r=R) that the broker knows about based on the tuple P' and R.

The blurring radius R may be chosen arbitrarily by the producer. For example, a producer may choose R=1 km. Before providing the position to the broker, the device will apply above described method A to determine the center P' of the blurred location area. As the computation of P' is performed, no information as to the true position P is leaked to the broker.

From the position characteristics (P', R) reported the broker may derive a number of properties. Knowing P' and R, the broker knows that the distance between the true position P of the producer and P' is at most R. Moreover, the difference between the true position P and an arbitrary position within the disk 801 defined by P' and R is at most 2R. Finally, the average distance between the true position P and any arbitrary position can be determined as 2R/3.

The above properties may particularly be useful for the broker when answering image requests: for a given position of interest Q, all producers for which Q $\in$ (P', R), i.e., Q is in their blurred location area, the maximal distance between Q and P is 2R, wherein the average distance is 2R/3. It may be noted that every producer may choose an arbitrary value R.

Further, the producer may change his position over time and send updates of the current position. Having two consecutive blurred positions P', the broker may take assumptions on the current true position P of a producer. In this regard, a method B is suggested which reports updates of the position to the broker when a user-defined update condition is fulfilled. In method B, the blurred position for a given blurring radius R is reported in regular time intervals. Method B has the following four steps:

In a first step, the true position $P_i$ is determined, e.g., by GPS.

In a second step, the method B is abandoned, if a pre-defined position update condition is not fulfilled. Otherwise, if the pre-defined position update condition is fulfilled, the method B proceeds with a third step.

In the following, two independent embodiments for position update conditions are described, wherein a third condition may be constructed by combining the two embodiments.

Figure 9:
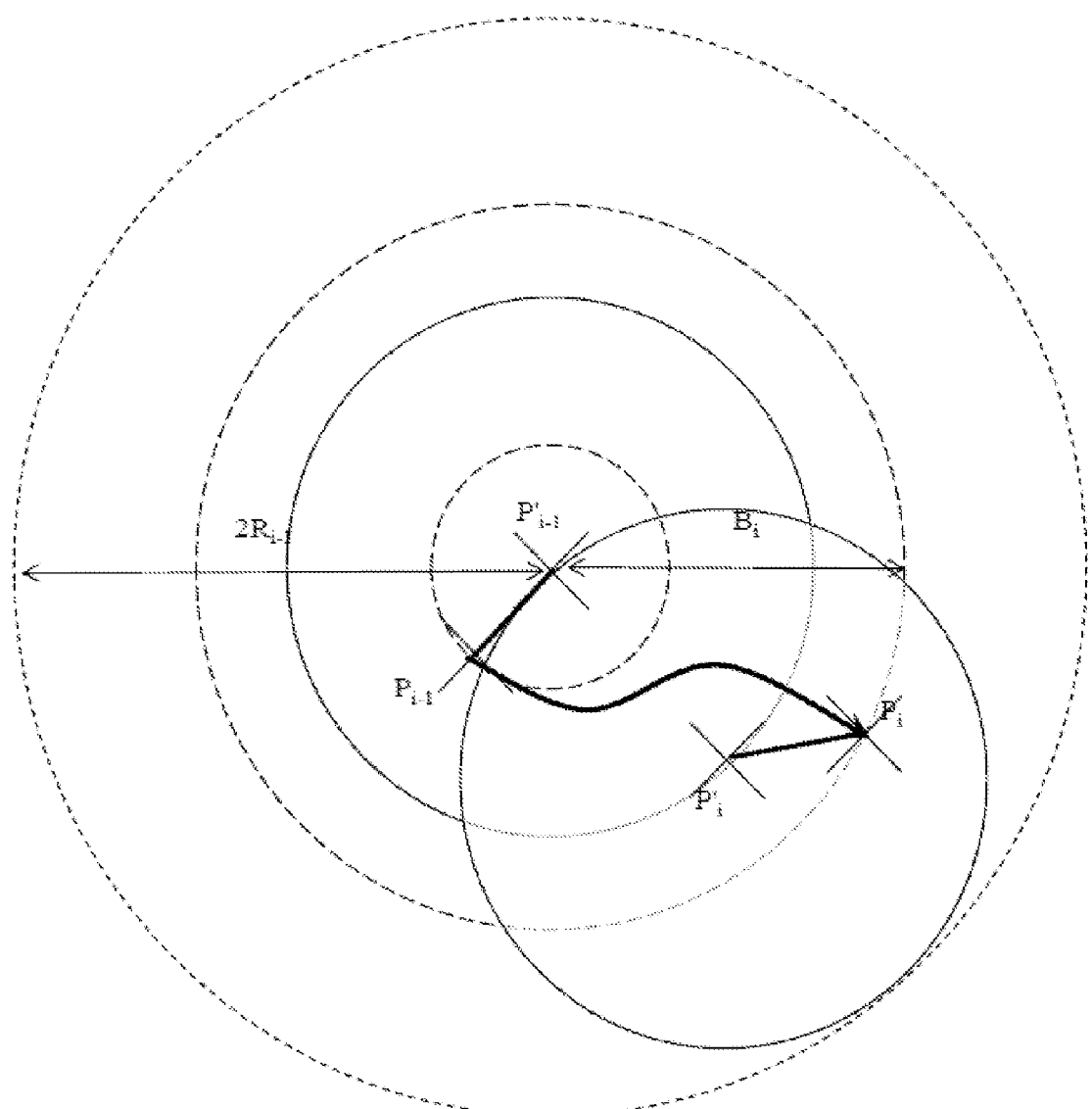
FIG. 9 shows a diagram illustrating an embodiment for a location update of the blurred location area announced to the device.

The first embodiment is based on location-based updates. This condition uses the previously reported position $P'_{i-1}$ and blurring radius $R_{i-1}$. A reporting boundary radius $B_i$ is chosen randomly in a uniform manner from the interval $[\rho_{i-1}, 2R_{i-1}]$, see FIG. 9. If the true position $P_i$ is on the edge of the disk defined by $(P'_{i-1}, B_i)$, i.e., the producer is about to leave the disk, a new position update is initiated. In this embodiment, at the time of the update and given $P'_{i-1}$ and $R_{i-1}$ together with $P'_i$ and $R_i$, the broker may only make weak assumptions as to the true position $P_i$ of the producer, that is the intersection between the disks defined by $(P'_{i-1}, 2R_{i-1})$ and $(P'_i, R_i)$. In fact, in the worst case, when $P'_i$ was chosen on the border of the disk defined by $(P'_{i-1}, 2R_{i-1})$, he may exclude at most 55.3% of the area reported. This is a consequence of the fact that the intersection is smaller than the disk $(P'_i, R_i)$. If the producer chooses $P'_i$ strictly within the area $(P'_{i-1}, R_{i-1})$, the broker may not make any assumptions, i.e., 0% of the area can be excluded as the new area is within the disk $(P'_{i-1}, 2R_{i-1})$. The case that $P'_i$ is on the border of $(P'_{i-1}, R_{i-1})$ is depicted in FIG. 9.

The second embodiment is based on time-based updates. In this second embodiment, a timeout maintained at the producer side is used as a condition for an update.

In a third step, the blurred position P' is determined as the result of method A with the input parameters P and R.

In a fourth step, the blurred position P' and the blurring radius R are announced to the broker.

Figure 10:
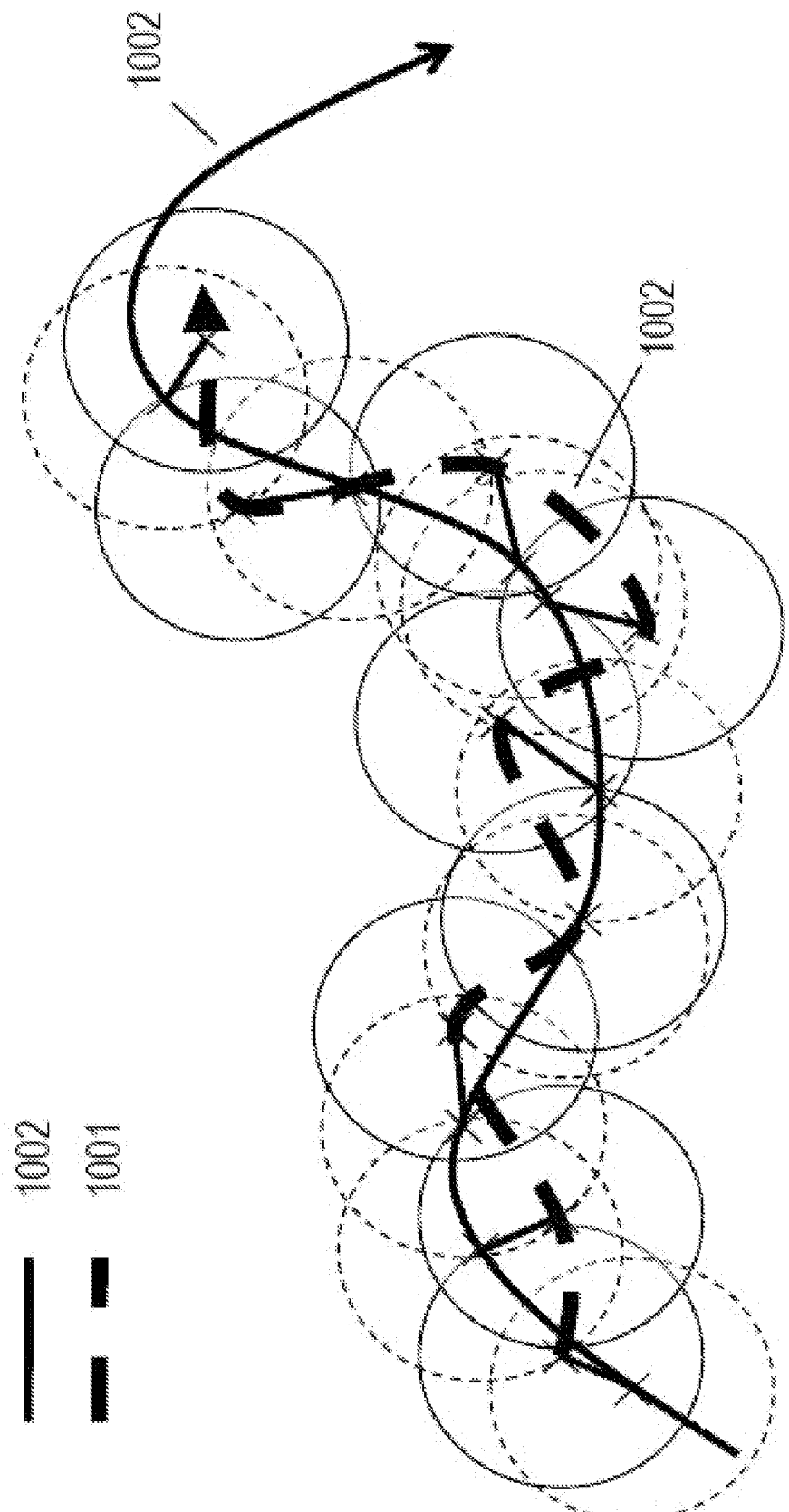
FIG. 10 shows a diagram illustrating an embodiment for the mobility of a device that causes sequential location updates of the blurred location area announced to the device.

An example of a blurred trajectory 1001 with nine position updates produced by method A is shown in FIG. 10. The blurred trajectory 1001 (dashed line) is an approximation of the true trajectory 1002 (solid line). As long as all true positions P are within the blurred location area, no new position is reported to the broker. Depending on the blurring radius R chosen by the producer, more information as to the true position may be inferred by the broker. At constant speed, the rate of information updates to the broker may vary in dependence on declining values of the blurring radii R, on the areas reported to the broker decrease and/or on the average reporting frequency increases, and so does the accuracy at the broker. Large blurring radii cause that the producer leaves the announced blurred location area less frequently, that is, new location updates are generated at lower rates and the update contains lower precision. In the extreme case, when $R \approx 0$, new positions are announced to the broker whenever method B is applied and $P_i$ is different from $P_{i-1}$.

Moreover, users may be interested in applying varying levels of accuracy reported from their true location. Thus, an automated rule-based adaptation of blurring radius is suggested. A user may desire not to reveal his true position whenever certain pre-defined conditions are met, e.g., during work time, or in a particular environment It is proposed that the user is able to configure pre-defined blurring radii when particular conditions are matched, like a particular time of the day or a certain geographic location.

Figure 11:
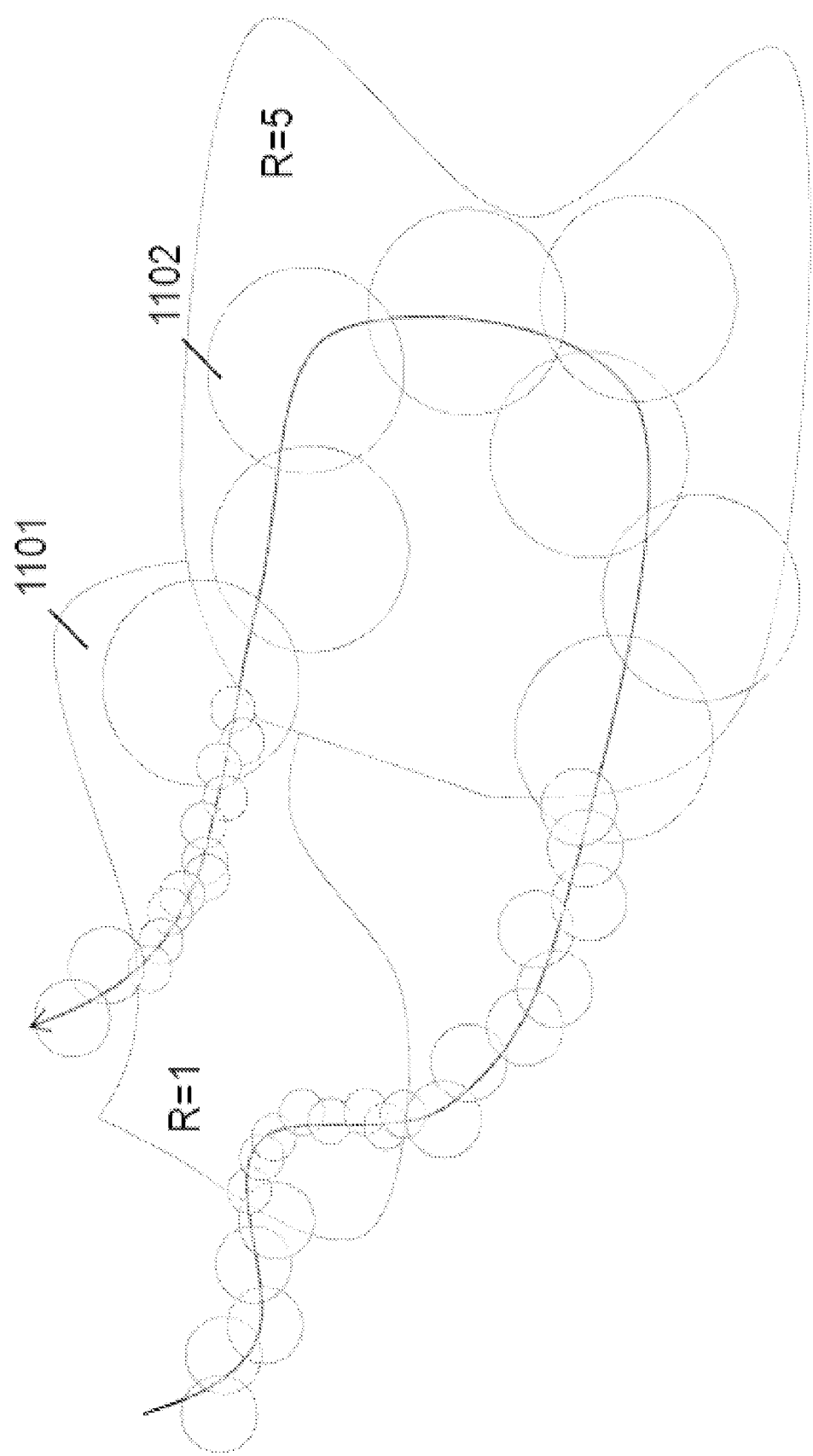
FIG. 11 shows a diagram illustrating an embodiment for location dependent blurring radii.

For example, in FIG. 11, it is assumed that the default blurring radius is R=2; the base unit may be kilometer, for example. Whenever the user enters a first pre-defined area 1101 with R=1, the device will automatically change the blurring radius and report more precise location information to the broker. When the user enters into a second pre-defined area 1102 with R=5, the device provides less accurate location information. Outside the areas 1101 and 1102, the default blurring radius R=2 is used.

All above-mentioned embodiments of the device of the present inventive subject matter may be embodied by respective steps to be a respective embodiment of the method of the present inventive subject matter.

According to an embodiment of a first aspect of the inventive subject matter, a device for providing location-specific image data to at least one requestor is suggested. The device is coupled to a number of producers of location-specific image data, each producer being adapted to provide location-specific image data of a certain location or certain locations and having a producer profile including at least a position indication indicating the position of the producer. The device has a receiver, a processor, and a transmitter. The receiver is configured to receive a request for location-specific image data of a certain location from the requestor. The processor is configured to match at least one producer with the requestor in dependence on the received request, the producer profiles and an actuality indication indicating a predefined actuality of the requested location-specific image data of the certain location. The transmitter is configured to transmit the requested location-specific image data from the at least one matched producer to the requestor.

The actuality indication indicates the necessary or required actuality or, in other words, up-to-dateness of the requested images. The actuality may be specified or predefined by the requestor and may be e.g. a time period or a point in time. As an example, the actuality indication might specify that an image may not be older than a specified time of a date, e.g. not older than 4 pm of month, day, year.

By specifying the required actuality of the location-specific image data, the device according to embodiments of the inventive subject matter can provide actual location specific image data or in other words current location specific image data or in other words time actual location specific image data to the requestor.

According to some implementations, a requestor may acquire actual location-specific image data or material in a timely and cost-efficient manner.

In particular, a service model for on-demand creation of image data from random places of interest, namely the certain location or locations, within short time bounds can be provided. Embodiments of the inventive subject matter build upon the increasing omnipresence of cameras, location awareness, e.g. GPS receivers, and high-speed connectivity in current and next generation hand-held devices. In this regard, also the requestor and the respective producer may be embodied by such a hand-held device. The device may be embodied by a service provider, a server or a broker who manages requests for location-specific image data, locates and notifies relevant producers, connects the matched producer with the requestor and, further, may handle potential remuneration.

According to some implementations, the image gathering process may be decoupled from the conventional few producers in a closed group to many image producers using a distributed community-based approach. Because a large number of producers building said community may be coupled to the device and said producers may be spread over a large area, location-specific image data may be provided for said large area advantageously. Further, said large number of producers may ensure a high-speed solution for providing the location-specific image data.

Furthermore, because of the above-mentioned community-based approach, the gathering or providing of location-specific image data may have lower operational costs compared to above-discussed conventional solutions. As an example, images may even be provided for low or no compensation by producers, depending on urgency, exclusiveness and quality of the requested location-specific image data.

According to some implementations, the requests of the requestors may be routed to producers subscribed with the device in the area of interest that might provide relevant location-specific image data within seconds, e.g. an aircraft crossing a highway on which an accident has been reported. Said area of interest may comprise the certain location for that location-specific image data are requested.

According to an embodiment, the device may provide a protocol between the requesting requestor and the producer providing the requested location-specific image data. Said protocol may preserve anonymity to the requestor and the producer during the transaction of the location-specific image data. In detail, by using the device in the middle between the requestor and the respective producer, anonymity to all communication end points may be preserved. Further, the device may be embodied to iteratively determine the producer or producers which fulfil the requestor's needs according to a certain request.

Image producers subscribed with the device may report their location or their possibly blurred location together with optional other attributes to the device. The requestor may place a request for location-specific image data from a random location optionally combined with a demand for particular properties of interest in the image to the device or service provider. Such particular properties may exemplarily define an overview picture, free parking spots, and queue conditions at a certain event or crowds at beaches.

The request for location-specific image data may be coupled with remuneration to provide incentives to the image producer.

The device or service provider may initiate the protocol and may select a set of producers that match best the request of the requestor. A producer may optionally decide to participate, wherein the requestor may choose among proposed producers who have decided to participate. The producer selected may be notified and may produce or provide said location-specific image data which may be transferred to the requestor via the service provider.

In an embodiment, the receiver is configured to receive updated producer profiles from the coupled producers of location-specific image data, and the processor is configured to match the at least one producer with the requestor in dependence on the received request, the received updated producer profiles and the actuality indication.

Producers may change their locations. By using the updated producer profiles, the device may know to a certain extent where the subscribed producers are and, therefore, may provide actual location-specific image data to a requesting requestor.

In a further embodiment, the receiver is configured to receive the request including the actuality indication. In this regard, the processor may be configured to extract the actuality indication from the received request and to match the at least one producer with the requestor in dependence on the received request, the producer profiles and the extracted actuality indication.

In a further embodiment, the device comprises a memory for storing a requestor profile for each requestor subscribed with the device. The respective requestor profile may have at least an actuality indication indicating a predefined actuality of the location-specific image data requested by the respective requestor. Here, the processor may be configured to match the at least one producer with the requestor in dependence on the received request, the producer profiles and the stored requestor profiles.

In a further embodiment, the device has a sender for sending participation requests to the producers that match with the requestor. Here, the receiver may be configured to receive participation responses from the matched producers in response to the sent participation requests.

In a further embodiment, the sender is configured to send a producer proposal to the requestor, wherein the processor is configured to generate the producer proposal in dependence on the received participation responses.

In particular, if a plurality of producers matches with the requestor, the device may use the producer proposal to give the requestor the opportunity to select one producer or a number of producers.

Said producer proposal may include the respective producer profile to give the requestor an adequate basis for his selection.

In a further embodiment, the receiver is configured to receive a producer selection from the requestor in response to the sent producer proposal, and the sender is configured to send an image request for triggering the transfer of the requested location-specific image data to the producer selected by the received producer selection.

In a further embodiment, the receiver is configured to receive an image response including the requested location-specific image data in response to the sent image request, and the sender is configured to send the received image response to the requestor.

In a further embodiment, the request for location-specific image data includes at least one of the following: the actuality indication, a location indication indicating the certain location for that the location-specific image data are requested, an object indication indicating a certain object for that the location-specific image data are requested, an event indication indicating a certain event for that the location-specific image data are requested, a type indication indicating a certain type for the requested location-specific image data, an urgency indication indicating a time limit for receiving the requested location-specific image data by the requestor, and/or a remuneration indication indicating a maximum remuneration for the requested location-specific image data.

The device may be embodied by or may be part of a service provider, a server or a broker. The requestor may be any requesting means or any requesting device, e.g. a mobile device, a hand-held, a computer or a navigation system of a vehicle.

The producer may have a camera for creating the location-specific image data. The producer may be a hand-held, a mobile or a mobile device. Moreover, the location-specific image data may be produced by a camera and uploaded to the service provider by a mobile device or by a personal computer. The request may be transferred from the requestor to the device by any communication link, in particular by any mobile communication link, e.g. by means of UMTS, LTE or GSM, or Wireless LAN.

Further, said location-specific image data may also be transferred over such a communication link. Further, the location-specific image data may comprise still images, like photographs, and/or motion images, like videos.

The certain location for which the location-specific image data is requested by the requestor may be the actual position of the requestor or a position defined by the requestor, e.g. a position the requestor may reach in the future.

The receiver may be any receiving means. Moreover, the processor may be any processing means. The transmitter may be any transmitting means. Furthermore, the sender may be any sending means.

The respective means, in particular the receiver, the processor, the transmitter and the sender, may be implemented in hardware or in software. If said means are implemented in hardware, it may be embodied as a device, e.g. as a computer or as a processor or as a part of a system, e.g. a computer system. If said means are implemented in software it may be embodied as a computer program product, as a function, as a routine, as a program code or as an executable object.

Any embodiment of the first aspect may be combined with any embodiment of the first aspect to obtain another embodiment of the first aspect.

According to an embodiment of a second aspect of the inventive subject matter, a system for providing location-specific image data to at least one requestor is suggested. The system comprises a number of producers of location-specific image data and a device according to said above mentioned first aspect or according to an embodiment of said above mentioned first aspect. Each producer may be adapted to provide actual location-specific image data of a certain location or certain locations. Further, each producer has a certain producer profile including at least a position indication indicating the position of the producer.

In an embodiment, the respective producer is configured to send an updated producer profile including a blurred position as the position indication to the device, said blurred position being configured to blur an action exact position of the producer.

In a further embodiment, the respective producer is configured to send the updated producer profile to the device in dependence on a defined change of the position of the producer or in dependence on a time-out of a timer for sending updated producer profiles.

In a further embodiment, the producer is configured to calculate the blurred position in dependence on the actual exact position of the producer, a distance random number and an angle random number. The distance random number may be selected by the requestor from the range [0, R]. R may be a certain blurring radius, e.g. by selected by the requestor. The angle random number may be selected from [0, 360°]. A reference for the angle random number may be pre-defined.

According to an embodiment of a third aspect of the inventive subject matter, a method for providing location-specific image data to at least one requestor from at least one of a number of producers of location-specific image data is suggested, each producer being adapted to provide location-specific image data of a certain location or certain locations and having a producer profile including at least a position indication indicating the position of the producer. The method has a step of receiving a request for location-specific image data of a certain location from the requestor. Further, the method has a step of matching at least one producer with the requestor in dependence on the received request, the producer profiles and an actuality indication indicating a predefined actuality of the requested location-specific image data of the certain location. Moreover, the method has a step of transmitting the requested location-specific image data from the at least one matched producer to the requestor.

According to an embodiment of a fourth aspect, the inventive subject matter relates an apparatus for sending location-specific image data to a device of the first aspect of the inventive subject matter, the apparatus being adapted to transmit a producer profile including at least a position indication indicating the position of the apparatus to the device and the apparatus being adapted to transmit location-specific image data of a certain location or certain locations to the device in response to an image request received from the device.

The apparatus serves as a producer of images for the device and is preferably configured to send an updated producer profile including a blurred position as the position indication to the device, said blurred position being configured to blur an actual exact position of the apparatus.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general, techniques for a broker service system that acquires location based image data as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   receiving a request from a requestor, wherein the request comprises request criteria that at least include a location criterion and a time criterion that indicates a time or time period for when to capture image data, wherein the image data comprises at least one of a still image and a video;
   determining that a position indication of a first producer of a plurality of producers fulfils the location criterion at least to an extent, wherein the plurality of producers comprise devices remote from the requestor and having capabilities of image capture and location determination;
   transmitting an image request to the first producer in response to determining that the position indication of the first producer fulfils the location criterion at least to an extent, wherein the image request corresponds to the request;
   receiving image data from the first producer responsive to the image request;
   determining that the image data was captured by the first producer in fulfilment of the time criterion; and
   transmitting the image data to the requestor.

2. The method of claim 1, further comprising receiving regular position indication updates from the plurality of producers, wherein the position indication blurs actual or true location of the first producer.

3. The method of claim 1 further comprising:
   determining that a position indication of a second of the plurality of producers at least partially fulfills the location criterion;
   transmitting the image request to the second producer as well as the first producer;
   receiving image data from the second producer responsive to the image request;
   determining that the image data from the second producer fulfills the time criterion; and
   transmitting the image data from the second producer to the requestor.

4. The method of claim 3 further comprising:
   transmitting participation requests to the plurality of producers;
   receiving responses to the participation requests, wherein the participation responses indicate conditions for accepting the image request, wherein the conditions include at least one of time to fulfil the image request and a minimum remuneration; and
   selecting the first and the second producers based, at least in part, on the responses and the request criteria.

5. The method of claim 4, wherein the request criteria also includes at least one of an object corresponding to the location criterion, an event corresponding to the location criterion, a type of image data, quality of image data, and a remuneration.

6. The method of claim 1 further comprising:
   determining, based on profiles of the plurality of producers, that the plurality producers fulfil the request criteria, wherein the profiles of the plurality of producers comprise ratings of image quality, timeliness, correctness, proficiency level, and reliability in responding to requests; and selecting the first producer from the plurality of producers based, at least in part, on the profile of the first producer relative to the other profiles.

7. The method of claim 1 further comprising:
determining that none of the plurality of producers fulfil the request criteria;
generating a weakened request criteria; and
transmitting the weakened request criteria to the plurality of producers.

8. The method of claim 6, wherein said generating the weakened request criteria comprises at least one of expanding geographic limits corresponding to the location criterion, adjusting time bounds corresponding to the time criterion, and reducing a quality criterion for image data.

9. The method of claim 8, wherein said determining that the position indication of the first producer of the plurality of producers fulfils the location criterion to at least an extent comprises determining that the position indication of the first producer of the plurality of producers fulfils a weakened location criterion of the weakened request criteria, wherein the weakened location criterion corresponds to the expanded geographic limitations.

10. A computer program product for a broker service to acquire location based image data, the computer program product comprising:
a non-transitory computer readable storage medium having computer usable program code embodied therewith, the computer usable program code comprising a computer usable program code configured to:
regularly collect updated position indications of a plurality of producers that are subscribed to the broker server, wherein the position indication of each of the plurality of producers indicates a blurred actual position of the producer;
acquire image data capture capabilities of the plurality of producers that at least indicate whether still images or video or both can be captured;
store requestor profiles, wherein each of the requestor profiles at least indicates a location to capture image data and a time bound for when to capture the image data;
for each of the requestor profiles, determine which of the plurality of producers fulfils the location indicated in the requestor profile;
for each of the requestor profiles that have at least one of the plurality of producers that fulfilling the requestor profile, transmit, to the at least one of the plurality of producers that fulfils the requestor profile, an image request indicating at least the location and the time bound;
responsive to receiving image data from a producer responding to an image request, transmit the image data to the requestor that corresponds to the requestor profile to which the image request corresponds.

11. The computer program product of claim 10, wherein the computer usable program code configured to determine which of the plurality of producers fulfils the location indicated in the requestor profile comprises the computer usable program code configured to determine which of the position indications encompass the location indicated in the requestor profile.

12. The computer program product of claim 10, wherein a requestor profiles also indicates at least one of an object corresponding to the location, an event corresponding to the location, image type, quality of image data expected, and a possible remuneration for image data.

13. A computer program product for a broker service to acquire location based image data, the computer program product comprising:
a non-transitory computer readable storage medium having computer usable program code embodied therewith, the computer usable program code comprising a computer usable program code configured to:
receive a request from a requestor, wherein the request comprises request criteria that at least include a location criterion and a time criterion that indicates a time or time period for when to capture image data, wherein the image data comprises at least one of a still image and a video;
determine that a position indication of a first producer of a plurality of producers fulfils the location criterion to at least an extent, wherein the plurality of producers comprise devices remote from the requestor and having capabilities of image capture and location determination;
transmit an image request to the first producer in response to a determination that the position indication of the first producer fulfils the location criterion at least to an extent, wherein the image request corresponds to the request;
receive image data from the first producer responsive to the image request;
determine that the image data was captured by the first producer in fulfilment of the time criterion; and
transmit the image data to the requestor.

14. The computer program product of claim 13, wherein the computer usable program code is further configured to collect regular position indication updates from the plurality of producers, wherein the position indication blurs actual or true location of the first producer.

15. The computer program product of claim 13, wherein the computer usable program code is further configured to:
determine that a position indication of a second of the plurality of producers at least partially fulfills the location criterion;
transmit the image request to the second producer as well as the first producer;
receive image data from the second producer responsive to the image request;
determine that the image data from the second producer fulfills the time criterion; and
transmit the image data from the second producer to the requestor.

16. The computer program product of claim 15 wherein the computer usable program code is further configured to:
transmit participation requests to the plurality of producers;
receive responses to the participation requests, wherein the participation responses indicate conditions for accepting the image request, wherein the conditions include at least one of time to fulfill the image request and a minimum remuneration; and
select the first and the second producers based, at least in part, on the responses and the request criteria.

17. A broker service apparatus for acquiring location based image data, the broker service apparatus comprising:
a processor;
a transmitter;
a receiver; and a computer readable storage medium having computer usable program code embodied therewith, the computer usable program code comprising a computer usable program code configured to:

regularly collect updated position indications of a plurality of producers that are subscribed to the broker server, wherein the position indication of each of the plurality of producers indicates a blurred actual position of the producer;

acquire image data capture capabilities of the plurality of producers that at least indicate whether still images or video or both can be captured;

store requestor profiles, wherein each of the requestor profiles at least indicates a location to capture image data and a time bound for when to capture the image data;

for each of the requestor profiles, determine which of the plurality of producers fulfils the location indicated in the requestor profile;

for each of the requestor profiles that have at least one of the plurality of producers that fulfilling the requestor profile, transmit, to the at least one of the plurality of producers that fulfils the requestor profile, an image request indicating at least the location and the time bound;

responsive to receiving image data from a producer responding to an image request, transmit the image data to the requestor that corresponds to the requestor profile to which the image request corresponds.

18. The apparatus of claim 17, wherein the computer usable program code configured to determine which of the plurality of producers fulfils the location indicated in the requestor profile comprises the computer usable program code configured to determine which of the position indications encompass the location indicated in the requestor profile.

19. The apparatus of claim 17, wherein a requestor profiles also indicates at least one of an object corresponding to the location, an event corresponding to the location, image type, quality of image data expected, and a possible remuneration for image data.

* * * * *